(12) United States Patent
Smith

(10) Patent No.: US 6,472,849 B1
(45) Date of Patent: Oct. 29, 2002

(54) REVERSE BLOCKING FUNCTION INTEGRATED INTO CHARGING CIRCUIT

(75) Inventor: Gregory J. Smith, Tuscon, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/969,082

(22) Filed: Oct. 1, 2001

(51) Int. Cl.$^7$ .................................................. H02J 7/00
(52) U.S. Cl. ...................................................... 320/138
(58) Field of Search ................................ 320/138, 136, 320/132; 340/635, 636

(56) References Cited

U.S. PATENT DOCUMENTS 5,867,008 A * 2/1999 Du et al. ..................... 320/136
5,909,101 A * 6/1999 Matsumoto et al. ........ 320/110

* cited by examiner

Primary Examiner—Edward H. Tso
Assistant Examiner—Pia Tibbits
(74) Attorney, Agent, or Firm—Merchant & Gould P.C.; Timothy P. Sullivan

(57) ABSTRACT

An apparatus and method is provided that blocks reverse currents. A PMOS device prevents reverse currents from draining the battery. The PMOS device is activated when a light load is detected on the cell. The light load detected may occur when the device is connected to the charger but the charger remains disconnected from a power source. A sense circuit is used to determine the voltage across a switch circuit. The reverse blocking function is activated when the cell voltage is a few millivolts above the charging signal. The reverse blocking function apparatus removes an external component from a conventional charger and integrates the function of the component onto the battery charging IC. The apparatus uses a lower compliance "on" voltage as compared to a conventional battery charger circuit that is intended to block reverse currents. The reverse blocking function apparatus integrated onto the battery charging IC requires less operating headroom as compared to a Schottky diode.

17 Claims, 4 Drawing Sheets

REVERSE BLOCKING FUNCTION INTEGRATED INTO CHARGING CIRCUIT

FIELD OF THE INVENTION

The present invention is related to electronic circuits, and more particularly to a charging circuit for blocking reverse currents.

BACKGROUND OF THE INVENTION

Many portable electronic devices utilize a rechargeable battery to provide power. These devices include computers, cellular telephones, pagers, radios, and the like. While there are many types of rechargeable batteries used today, including nickel cadmium and nickel metal hydride, lithium ion batteries have become a popular choice. Lithium ion batteries are typically smaller and lighter than other rechargeable battery types while charge capacity is increased.

Typically, to charge a battery, a battery is connected to a charger that is plugged into an AC outlet. During the time the charger is plugged in and the device is in the charger, an indicator light on the charger generally shows the charging status of the battery. For example, the indicator light may flash when the battery is charging and be on constantly when the battery is fully charged. If the user removes the charger plug from the wall with the device still in the charger, the stored charge of the battery may be reduced.

Even when the battery is not being used within an electronic device, energy may be lost due to the internal circuitry contained within the battery. If the battery is discharged too deeply, the life cycle of the battery may be reduced. For example, the battery may slowly discharge when the battery is connected to the charger but the charger is not connected to the power source. The amount of energy lost between the time when the battery is connected to a charger that is not connected to a power supply and when the battery is connected to a power supply can result in the battery being deeply discharged. Potentially, the battery may not be able to store energy if discharged too deeply.

SUMMARY OF THE INVENTION

The present invention is directed at providing an apparatus that is integrated onto a battery charging integrated circuit (IC) for blocking reverse discharge currents of a rechargeable battery.

According to one aspect of the invention, a PMOS device prevents reverse currents from draining the battery. The PMOS device is activated when a light load is detected on the cell and the cell is not being charged. The light load detected may occur when the device is connected to the charger but the charger remains disconnected from a power source. A sense circuit is also used to help determine when the charger is not connected to the battery.

According to another aspect of the invention, the reverse blocking function apparatus removes an external component from a conventional charger and integrates the function of the component onto the battery charging IC.

According to yet another aspect of the invention, the apparatus uses a lower compliance "on" voltage as compared to a conventional battery charger circuit that is intended to block reverse currents. For example, the reverse blocking function apparatus integrated onto the battery charging IC requires less headroom as compared to a Schottky diode.

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means a direct electrical connection between the items connected, or an indirect connection through one or more passive or active intermediary devices. The term "circuit" means either a single component or a multiplicity of components, either active and/or passive, that are coupled to provide a desired function. The term "signal" means at least one current signal, voltage signal, electromagnetic wave signal, or data signal. The term "battery" includes single cell batteries and multiple cell batteries. The term "cell" includes single rechargeable cells and multiple rechargeable cells. The term "battery" and "cell" may be used interchangeably.

Figure 1:
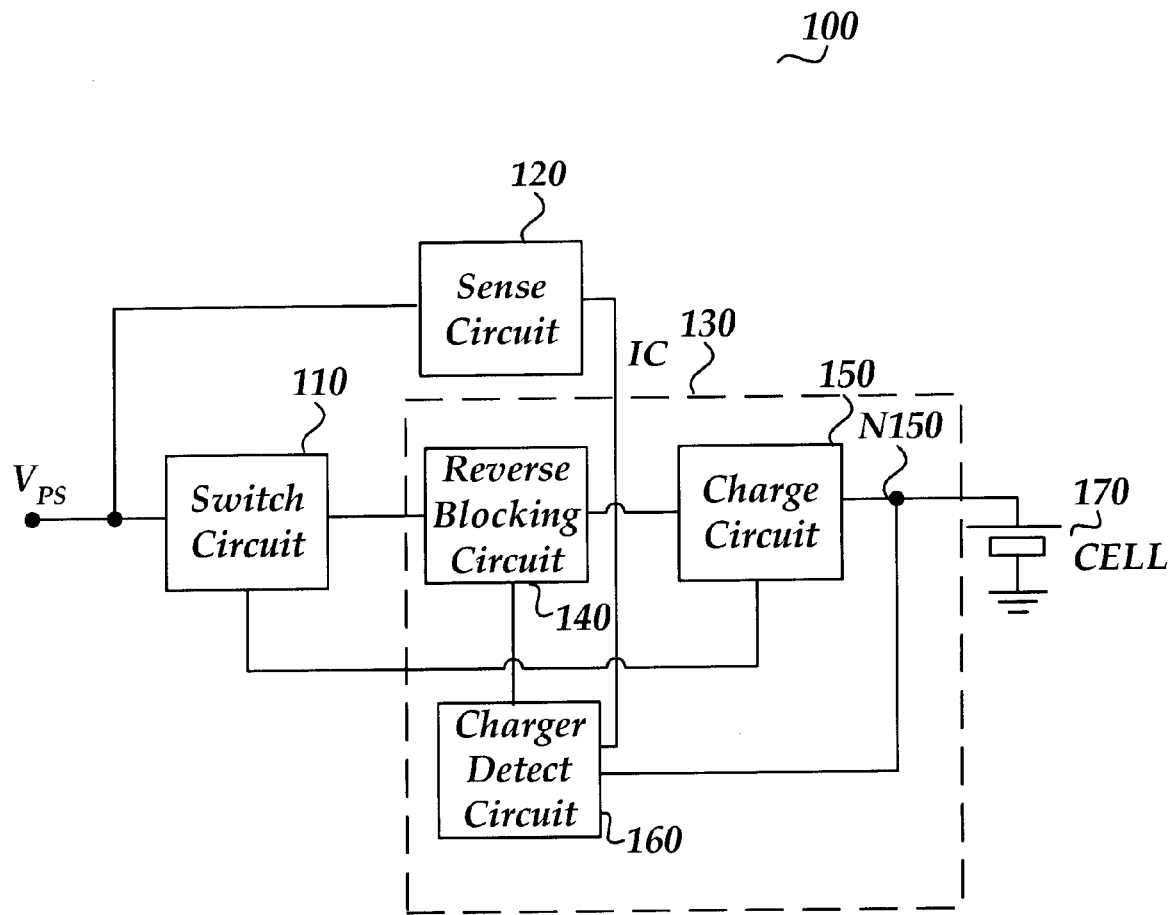
FIG. 1 shows an overview schematic diagram of a charger circuit that blocks reverse currents.

FIG. 1 shows an overview schematic diagram of a charger circuit that blocks reverse currents, in accordance with aspects of the invention. As shown in the figure, charger circuit 100 includes switch circuit 110, sense circuit 120, IC 130, and cell 170. IC 130 includes reverse blocking circuit 140, charge circuit 150, and charger detect circuit 160.

Switch circuit 110 has an input that is coupled to a power signal ($V_{PS}$), an input that is coupled to charge circuit 150, and an output that is coupled to reverse blocking circuit 140. Reverse blocking circuit 140 has an input that is coupled to switch circuit 110, an input that is coupled to charge detect circuit 160, and an output that is coupled to charge circuit 150. Charge circuit 150 has an input that is coupled to reverse blocking circuit 140, an output that is coupled to switch circuit 110, and an output that is coupled to cell 170. Charger detect circuit 160 has an input that is coupled to node N150, an input that is coupled to sense circuit 120, and an output that is coupled to reverse blocking circuit 140.

The operation of charger circuit 100 will now be described. Generally, charge circuit 150 charges cell 170 when the charger is connected to a power source and cell 170 is not fully charged. When the charger is not connected to a power source but the device is coupled to the charger, charger detect circuit 160 outputs a blocking signal that activates reverse blocking circuit 140 preventing reverse currents from draining the charge stored in cell 170.

When activated switch circuit 110 provides a charging signal that is used to charge cell 170. Switch circuit 110 may regulate the charge signal in response to a feedback signal provided by charge circuit 150. Charge circuit 150 determines the charge level of cell 170 and provides a feedback signal relating to the charge level of cell 170 to switch circuit 110. In response to the feedback signal, switch circuit 110 regulates the charging signal to cell 170. For example, when cell 170 is fully charged, charge circuit 150 provides a feedback signal that deactivates switch circuit 110. When cell 170 is charging, the feedback signal is used to regulate the level of the charging signal received by cell 170. The regulated charging allows cell 170 to be charged at different rates during different charging periods. Reverse blocking circuit 140 couples the charging signal to charge circuit 150 when cell 170 is charging.

Sense circuit 120 senses a sense signal relating to the charging signal across switch circuit 110. The sense signal is an estimation of the charging signal that is coupled to cell 170. According to one embodiment of the invention, the sense signal relates to the voltage across switch circuit 110.

Charger detect circuit 160 determines when to activate reverse blocking circuit 140 thereby preventing reverse currents from draining cell 170. According to one embodiment of the invention, charger detect circuit 160 determines when a charger is connected to the device but the charger is not connected to a power source. To make this determination, charger detect circuit 160 makes a comparison between the sense signal and the cell signal at node N150, that relates to the cell's charge level, and outputs a blocking signal in response to the comparison. The blocking signal has an active state that is set when reverse blocking circuit 140 is to be activated and an inactive state during other times. According to one embodiment of the invention, charger detect circuit 160 outputs a blocking signal to set reverse blocking circuit 140 to the active state when the sense signal is a few millivolts below the cell signal, and an inactive state otherwise.

Reverse blocking circuit 140 blocks reverse currents from draining cell 170 when active. Reverse blocking circuit 140 is activated or deactivated in response to the state of the blocking signal. The blocking signal may be more than two states. When the charger becomes a resistive path to ground (i.e. the charger is unplugged), charger detect circuit 160 outputs a blocking signal having an active state. While cell 170 is charging, charger detect circuit 160 outputs a blocking signal having an inactive state.

As can be seen by referring to FIG. 1, reverse blocking circuit 140 is integrated onto IC 130. Additionally, reverse blocking circuit 140 does not require as much operating headroom as compared to a Schottky diode.

Figure 2:
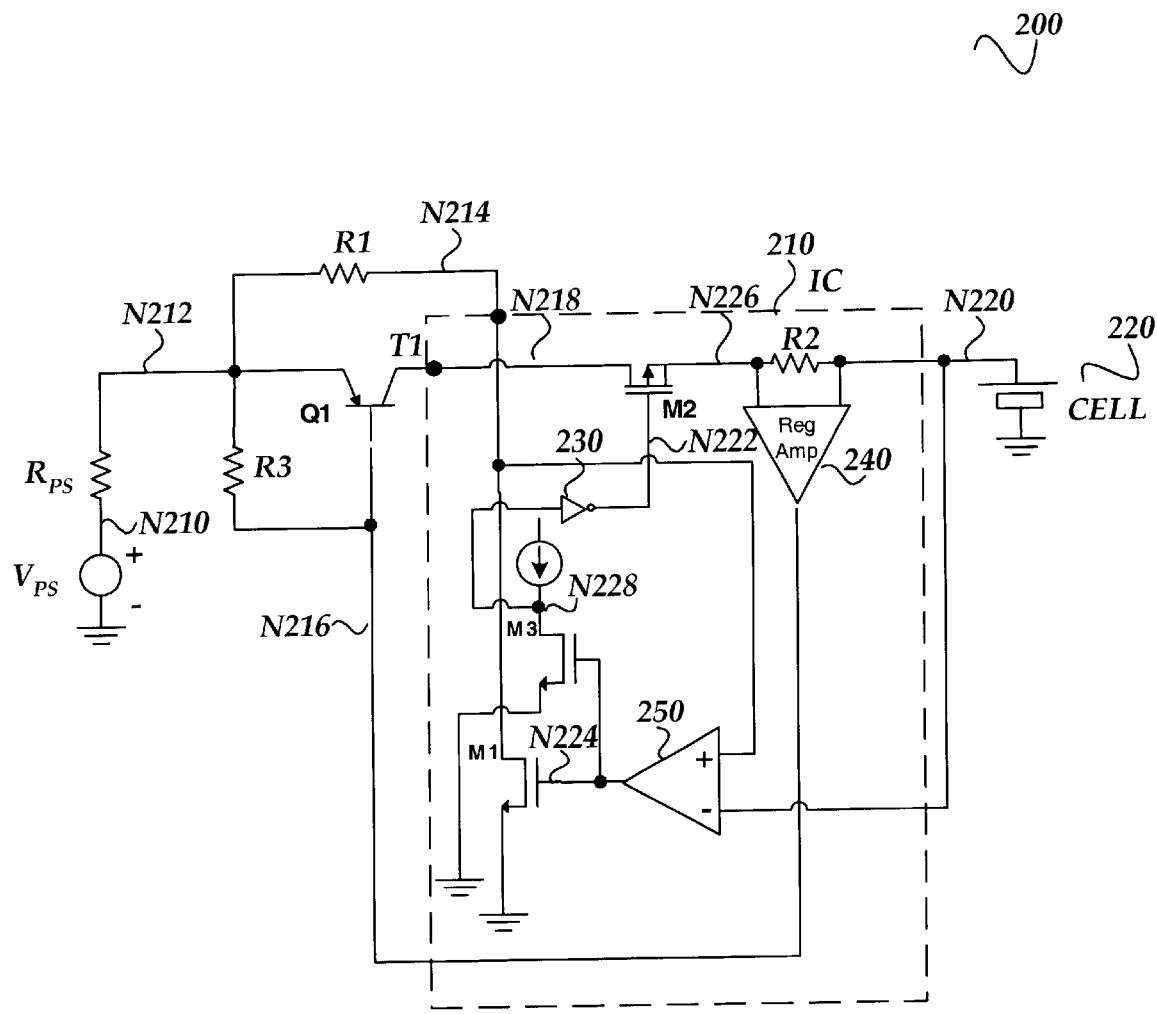
FIG. 2 illustrates a schematic diagram of a charger circuit that blocks reverse currents.

FIG. 2 illustrates a schematic diagram of a charger circuit that blocks reverse currents, according to one embodiment of the invention. As shown in the figure, charger circuit 200 includes voltage power source $V_{PS}$, resistors $R_{PS}$, R1, and R3, transistor Q1, IC 210, and cell 220. IC 210 includes resistor R2, inverter 230, transistor circuits M1, M2, and M3 and amplifier circuits 240 and 250.

$V_{PS}$ is coupled between ground and node N210. $R_{PS}$ is coupled between node N210 and node N212. Resistor R1 is coupled between node N212 and N214. Resistor R3 is coupled between node N212 and node N216. Transistor Q1 has an emitter coupled to node N212, a base coupled to node N216, and a collector coupled to node N218. Resistor R2 is coupled between node N226 and node N220. Inverter 230 is coupled between node N228 and node N222. Transistor M1 has a drain coupled to node N214, a source coupled to ground, and a gate coupled to node N224. Transistor M3 has a source coupled to ground, a drain coupled to node N228, and a gate coupled to node N224. Node N228 is coupled to a current source. Amplifier circuit 250 has a non-inverting input (+) coupled to node N214, an inverting input (−) coupled to node N220, and an output coupled to node N224. Transistor M2 has a drain coupled to node N218, a source and body coupled to node N226, and a gate coupled to node N222. Amplifier circuit 240 has an input coupled to node N226, an input coupled to node N220, and an output coupled to node N216. Cell 220 is coupled between node N220 and ground.

The operation of reverse blocking charger circuit 200 will now be described. Resistor R1 is used as a sense circuit to sense the voltage across PNP device Q1. According to one embodiment of the invention, resistor R1 is 2 KΩ. Accordingly, if there is six (6) volts across transistor Q1 and resistor R1 is 2 KΩ, then sense circuit R1 senses that 3 mA is flowing through transistor Q1 and outputs the corresponding sense signal. The voltage across resistor circuit R1 is the difference between the power supply voltage ($V_{PS}$) and the cell voltage, which is roughly the same voltage as across the PNP.

Amplifier circuit 250 and transistor M1 are arranged as a shunt amplifier. The shunt amplifier is used to make the determination of whether the external charger voltage is above or below the cell voltage. The shunt amplifier conducts when the external charger voltage is above the cell voltage. The shunt amplifier does not conduct when the external charger voltage is below the cell voltage by a predetermined threshold. Transistor M2 turns off when the shunt amplifier stops conducting. According to one embodiment of the invention, the shunt amplifier stops conducting as soon as the voltage across R1 drops a few millivolts below the cell voltage causing transistor M2 to turn off.

PMOS transistor M2 is arranged to block the reverse current path that would allow cell 220 to discharge currents through transistor Q1. In other words, PMOS transistor M2 is configured to disconnect cell 220 from any potential drain when $V_{PS}$ goes to zero.

Device M2 also prevents reverse current flow through device Q1 when there is only a light load detected. The light load may be when the device is connected to the charger but the charger remains disconnected from a power source. The discharge current path is blocked when the charger becomes a resistive path to ground.

Reverse blocking charger circuit 200 shown has a lower "on" voltage as compared to a charging circuit that utilizes a Schottky diode to aid in blocking reverse currents. Reverse blocking charger circuit 200 may also operate in lower headroom conditions as compared to a conventional battery charger circuits. Additionally, in conventional charging circuits, the Schottky diode that is used for blocking reverse currents is external to the battery charging IC adding an extra component that is external to the charger IC.

The position of transistor M2 may be on the other side of regulation amp 240. Additionally, transistor circuit M3 is optional and may be removed. According to this particular embodiment, inverter 230 is coupled between node N214 and node N222.

Figure 3:
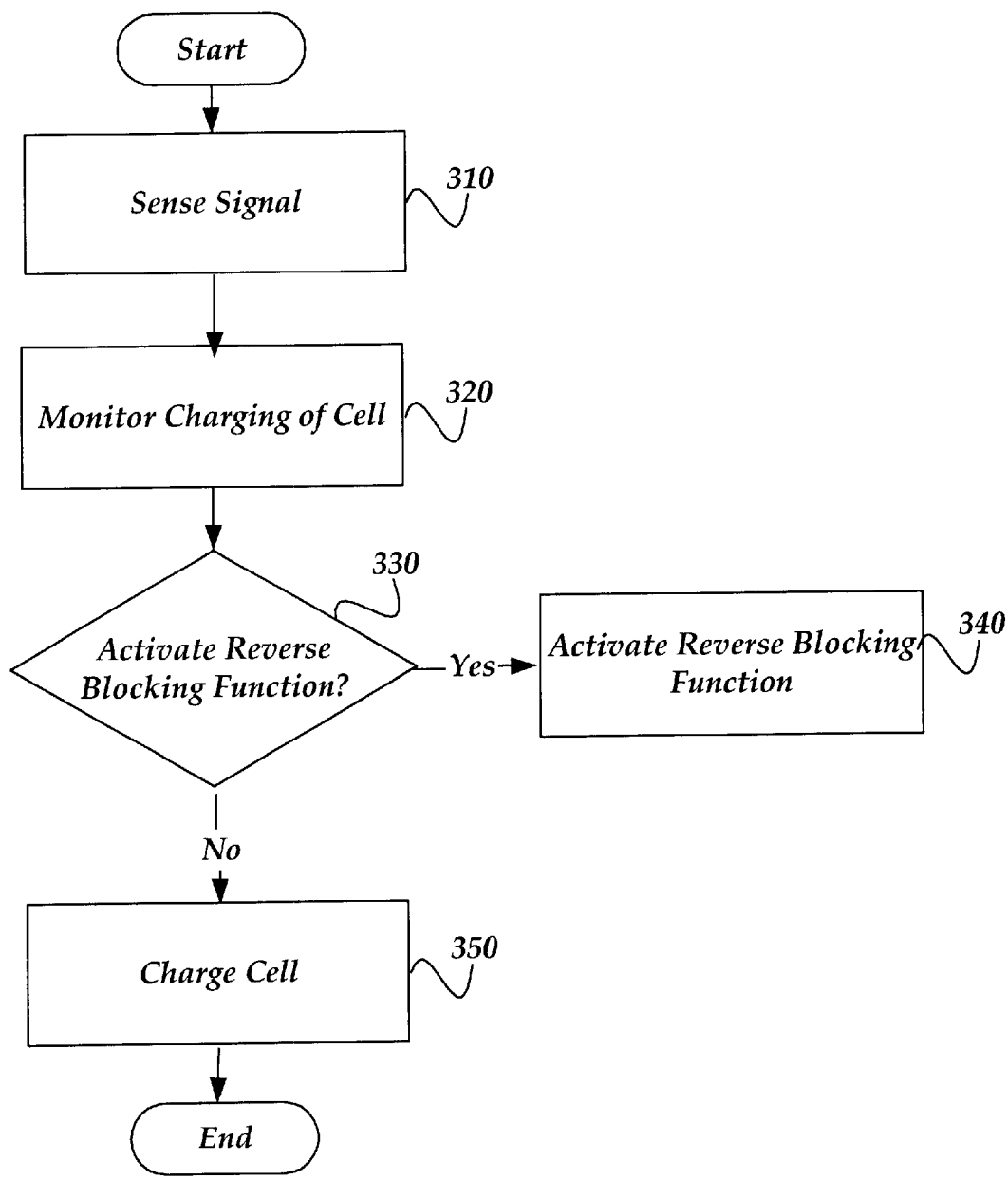
FIG. 3 illustrates a flow chart for a process for blocking reverse currents for a battery charger.

FIG. 3 illustrates a flow chart for a process for blocking the reverse currents for a battery charger, in accordance with aspects of the invention. After a start block, the process moves to block 310 at which point the logic senses a sense signal relating to the charging signal. According to one embodiment of the invention, the sense signal relates to a voltage across a switching circuit. Moving to block 320, the charging of the cell is monitored. The charging of the cell is monitored to determine when to charge the cell. The charging of the cell is based on the cells charge level as well as the charging signal. Transitioning to decision block 330, the logic detects when to activate the reverse blocking function (See FIG. 4 and related discussion). Generally, a comparison is made between the cells charge level and the sense signal level. Activating the reverse blocking function occurs when there is a predetermined difference between the sense signal level and the cell signal level (block 340). According to one embodiment of the invention, activating the reverse blocking function occurs when the sense signal level is a few millivolts below the cell's charge level. The cell is charged when the reverse blocking function is not activated and the cell's charge level has not reached the predetermined threshold (block 350). The threshold relates to the charge capacity of the battery. Next, the process steps to an end block and terminates.

Figure 4:
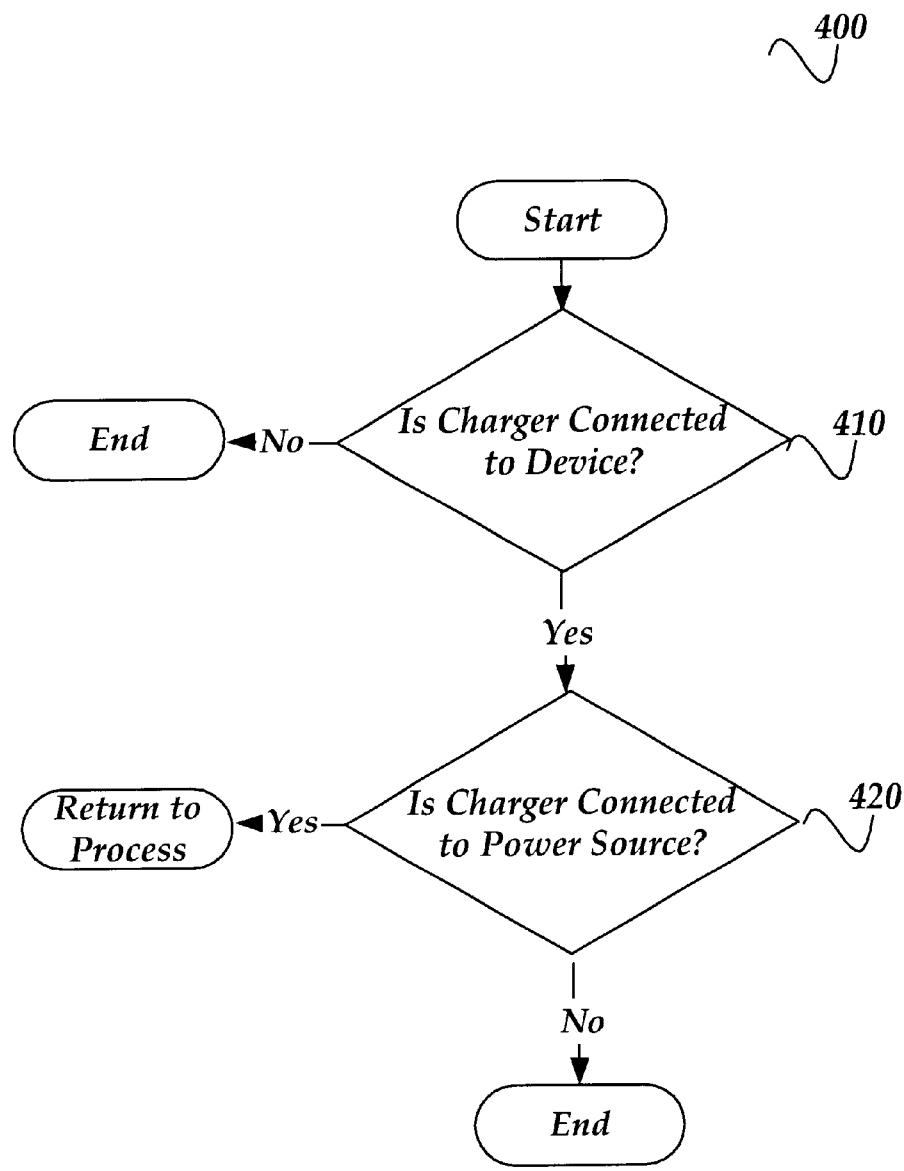
FIG. 4 illustrates a flow chart for a process for determining if a battery is coupled to a charger that is not coupled to a power source, in accordance with aspects of the invention.

FIG. 4 illustrates a flow chart for a process for determining if a battery is coupled to a charger that is not coupled to a power source, according to one embodiment of the invention. After a start block, the process moves to decision block 410 at which point the logic determines if a charger is connected to the device that includes the rechargeable cell. When a charger is coupled to the cell, the process steps to decision block 420 at which point the logic determines if the charger is connected to a power source. When the charger is connected to the power source, the logic steps to an end block and terminates. When the charger is not connected to the power source, the process returns to the process and activates the reverse current blocking function (See FIG. 3, block 340). During the time the charger is not connected to the power source the reverse blocking function remains active helping to ensure that no charge is no lost from the battery. The reverse current blocking is deactivated when the charger is connected to the power source.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for a battery charging integrated circuit (IC) that blocks reverse currents from draining a battery, comprising:
    a switch circuit that includes a first input that is coupled to a power signal, a second input that is coupled to a feedback signal, and an output that is arranged to provide a charging signal;
    a sense circuit that includes an input that is coupled to the power signal and an output that is arranged to output a sense signal relating to the charging signal through the switch circuit;
    a reverse blocking circuit integrated onto IC that includes a first input that is coupled to charging signal, a second input that is arranged to receive a blocking signal indicating when to activate and deactivate the reverse blocking circuit, and an output that is arranged to couple the charging signal in response to the blocking signal;
    a charge circuit that includes an input that is coupled to charging signal, a first output that is coupled to the second input of the switch circuit and that is arranged to provide the feedback signal, and a second output that is arranged to couple the charging signal to the battery; and
    a charger detect circuit that includes a first input that is coupled to a cell signal relating to a current charge level of the battery, a second input that is coupled to the sense signal, and an output arranged to provide the blocking signal.

2. The apparatus of claim 1, wherein the blocking signal is produced in response to a comparison between the sense signal and the cell signal.

3. The apparatus of claim 2, wherein the charging signal output by the switch circuit is regulated by the feedback signal.

4. The apparatus of claim 3, wherein the blocking signal includes an active state and an inactive state, the active state set when the when the cell signal is above the sense signal by a predetermined threshold.

5. The apparatus of claim 4, wherein the predetermined threshold is a few millivolts.

6. The apparatus of claim 3, wherein the reverse blocking circuit further comprises a transistor device that is arranged to couple the charging signal during when deactivated and block reverse currents when activated.

7. The apparatus of claim 6, wherein the transistor is a PMOS device.

8. The apparatus of claim 7, wherein the sense circuit further comprises a resistor circuit.

9. The apparatus of claim 8, wherein the switch circuit further comprises a PNP device.

10. The apparatus of claim 9, wherein the charger detect circuit further comprises a shunt amplifier circuit that includes a first input that is coupled to the cell signal, a second input that is coupled to the sense signal and an output that is arranged to provide the blocking signal.

11. A method for preventing reverse currents from draining a battery, comprising:
    sensing a sense signal relating to a signal through a switching circuit;
    monitoring the charging of the battery; and
    activating a reverse blocking function that is integrated onto a battery charging IC in response to the sensing and the monitoring.

12. The method of claim 1, wherein the monitoring of the charging of the battery, further comprises:
    determining when a charger is coupled to the battery; and
    determining when the charger is coupled to a power source.

13. The method of claim 12, wherein monitoring the charging of the battery further comprises determining a cell signal relating to a charging level of the battery.

14. The method of claim 13, wherein activating the reverse blocking function in response to the sensing and the monitoring, further comprises activating the reverse blocking function in response to a comparison between the sense signal and the cell signal.

15. The method of claim 14, wherein activating the reverse blocking function in response to the comparison between the sense signal and the cell signal further comprises determining when the cell signal is a predetermined difference from the sensed signal.

16. The method of claim 15, wherein the predetermined difference is a few millivolts.

17. An apparatus for blocking reverse currents from draining a battery, comprising:
    a means for sensing a sense signal relating to a signal through a switching circuit;
    a means for monitoring the charging of the battery; and
    a means for activating a reverse blocking function that is integrated onto a battery charging IC in response to the sensing and the monitoring.

* * * * *